(12) United States Patent
Chandrasekaran

(10) Patent No.: US 8,284,938 B2
(45) Date of Patent: Oct. 9, 2012

(54) TECHNIQUES FOR DATA ENCRYPTION AND DECRYPTION

(75) Inventor: Karthik Chandrasekaran, Bangalore (IN)

(73) Assignee: Novell, Inc., Provo, UT (US)

( * ) Notice: Subject to any disclaimer, the term of this patent is extended or adjusted under 35 U.S.C. 154(b) by 469 days.

(21) Appl. No.: 12/604,585

(22) Filed: Oct. 23, 2009

(65) Prior Publication Data

US 2011/0096926 A1   Apr. 28, 2011

(51) Int. Cl.
*H04L 9/14* (2006.01)
*H04L 9/00* (2006.01)

(52) U.S. Cl. ......... 380/259; 380/255; 380/284; 713/150

(58) Field of Classification Search .................. 380/255, 380/259, 284; 713/150, 171
See application file for complete search history.

(56) References Cited

U.S. PATENT DOCUMENTS

| | | | |
|---|---|---|---|
| 6,493,449 B2 * | 12/2002 | Anshel et al. | 380/30 |
| 7,133,523 B2 * | 11/2006 | Campagna et al. | 380/28 |
| 7,136,484 B1 * | 11/2006 | Koh | 380/28 |
| 7,188,258 B1 * | 3/2007 | Aggarwal et al. | 713/194 |
| 7,401,226 B2 * | 7/2008 | Girault et al. | 713/180 |
| 7,525,202 B2 * | 4/2009 | Freedman et al. | 257/798 |
| 8,014,630 B1 * | 9/2011 | Polyakov et al. | 382/282 |
| 2006/0045269 A1 * | 3/2006 | Freedman et al. | 380/264 |
| 2006/0126829 A1 | 6/2006 | Lai | |
| 2007/0061570 A1 * | 3/2007 | Holtzman et al. | 713/168 |
| 2008/0298596 A1 | 12/2008 | Kuraki et al. | |
| 2009/0022313 A1 | 1/2009 | Akiyama et al. | |
| 2009/0041249 A1 | 2/2009 | Tanaka et al. | |
| 2009/0154703 A1 | 6/2009 | Price et al. | |
| 2009/0164513 A1 | 6/2009 | Astigarraga et al. | |
| 2009/0220076 A1 | 9/2009 | Kuraki et al. | |

OTHER PUBLICATIONS

Joan S. Birman, Tara E. Brendle, "Braids: A Survey", Dec. 2, 2004, Handbook of Knot Theory, 2005 Elsevier B.V.*

* cited by examiner

*Primary Examiner* — Linglan Edwards
(74) *Attorney, Agent, or Firm* — Schwegman, Lundberg & Woessner, P.A.

(57) ABSTRACT

Techniques for securing data access are presented. A sender encrypts data into a first integer value. A first knot is selected along with first and second keys. The first knot, first integer value, first key, and second key are used to produce a final knot. The final knot is transmitted as a graphical image to a receiver over a network. The receiver uses the first knot, final knot, first key, and second key to derive the first integer value. The first integer value is decrypted to produce the original data that the sender intended to send securely to the receiver.

14 Claims, 3 Drawing Sheets

TECHNIQUES FOR DATA ENCRYPTION AND DECRYPTION

BACKGROUND

Electronic information is becoming the lifeblood of enterprises and individuals. Information is stored for virtually all aspects of one's life and all transactions that an enterprise engages in. This information is often indexed and stored in directories and/or databases in network repositories.

Furthermore, business communications and personal affairs are conducted over the Internet. The physical location of entities is no longer of any consequence as information and currencies flow nearly instantaneously around the globe via the Internet.

Accordingly, secure communication is essential for virtually all activities of an organization. Information that is proprietary to the organization is often encrypted before being exposed on a network wire and transmitted from a sender to a recipient over a network (e.g., Internet connection, satellite connection, cellular connection, etc.). In fact, often times the very communication protocol used between the sender and recipient for communication with one another over the network is encrypted. For example, enterprises may use Virtual Private Networks (VPN's) tunneled over the Internet between senders and receivers for communication.

Enterprises may also deploy Public Key Infrastructure (PKI) techniques in combination with other security measures in the hopes of thwarting any attempt by someone trying to gain access to confidential information.

Even with all these precautionary measures, intruders and eavesdroppers, with enough motivation and time, can crack even the best encryption techniques and security measures taken by organizations. These malefactors look for patterns occurring in sender-receiver communications, intercept keys, obtain insider information, attempt to dupe legitimate users, etc. for purposes of illegally acquiring confidential information.

Thus, what are needed are improved techniques for encrypting and decrypting data communicated over a network.

SUMMARY

In various embodiments, techniques for data encryption and decryption are presented. More specifically, and in an embodiment, a method for data encryption is provided. A first knot is received from a sender. Also, a first symmetric key, having a first value, and a second symmetric key, having a second value, are securely exchanged with a recipient over network; the first value representing a series of knot processing transitions. The first knot is repeatedly composed for a genus equal to the second value to produce a second knot. Next, a block of data to encrypt is acquired as a block value from the sender. The first knot is repeatedly composed for a genus equal to the block value to produce a third knot. The series of knot processing transitions are performed on the third knot to produce a modified third knot. The modified third knot is combined with the second knot to produce a final knot. The final knot is sent to the recipient over the network as an encrypted version of the block of data.

DETAILED DESCRIPTION

As used herein a "principal" refers a user, network resource, or an automated service that processes as instructions on a processing device. Principals are authenticated via an "identity" for access to secure network services.

A "sender" and a receiver" are principals herein and below. In an embodiment, a sender and/or a recipient are users. In another embodiment, a sender and/or recipient are automated services that execute as instructions on processing devices, which are specifically configured to process those instructions.

An identity is authenticated via various techniques (e.g., challenge and response interaction, cookies, assertions, etc.) that use various identifying information (e.g., identifiers with passwords, biometric data, hardware specific data, digital certificates, digital signatures, etc.). A "true identity" is one that is unique to a principal across any context that the principal may engage in over a network (e.g., Internet, Intranet, etc.). However, each principal may have and manage a variety of identities, where each of these identities may only be unique within a given context (given service interaction, given processing environment, given virtual processing environment, etc.).

A "credential" is identifying information used with an authentication mechanism to establish, authenticate, and set an identity for a principal during a given session with a secure service. Again, the credential can include a digital certificate, digital signature, assertion, identifier and password combination, etc.

The term "session" refers to an online interactive, dynamic, and real time set of communications between one or more principals.

A "knot" is an embedding of a circle in three-dimensional Euclidean space. The knot can be represented in graphical image form or as coordinates, which can be used to produce the graphical image form. A knot is a closed geometric figure having no open ends. So, a knot may be viewed as a graphical representation of a rope whose ends are closed. Two knots are considered equivalent if one knot can be obtained from another by Reidemeister moves. Reidemeister moves are transformations performed on knots that involve moving individual segments of the knots over one another and tying the knots. There are three Reidemeister moves.

Each knot has an invariant associated with it called its genus; the genus is a positive integer. When two knots are composed together their genus is added.

According to an embodiment, the techniques presented herein are implemented in proxy-server products, directory-based products, storage-access based products, and/or operating-system products, distributed by Novell, Inc. of Provo, Utah.

Of course, the embodiments of the invention can also be implemented in a variety of products and/or devices. Any particular architectural layout or implementation presented herein is provided for purposes of illustration and comprehension only and is not intended to limit various aspects of the invention.

Figure 3:
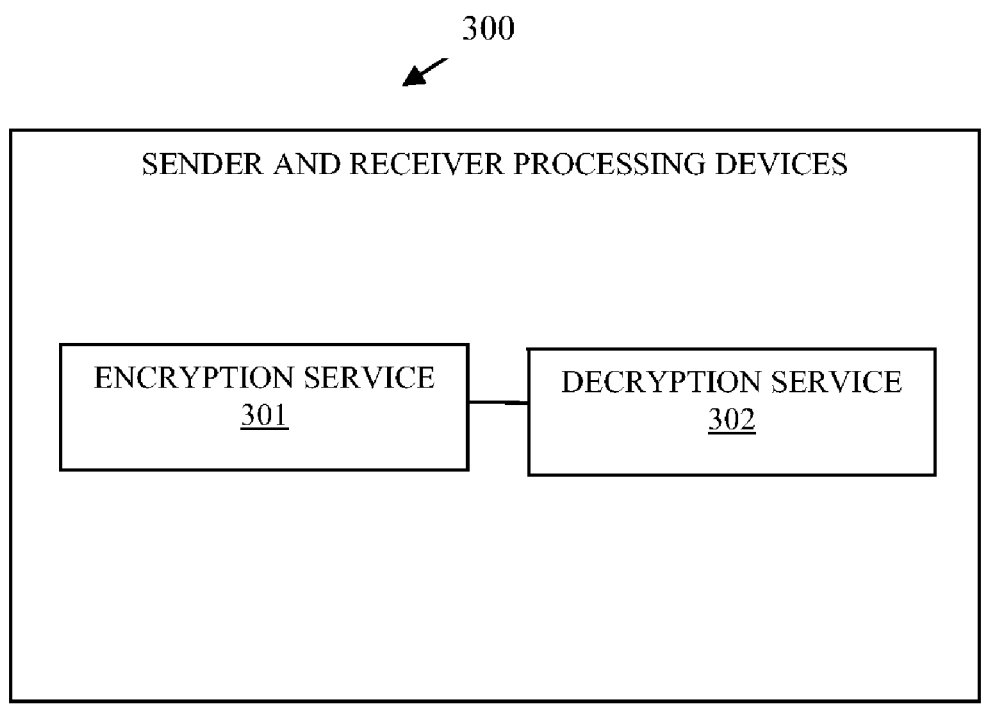
FIG. 3 is a diagram of a data encryption and decryption system, according to an example embodiment.

It is within this initial context, that various embodiments of the invention are now presented with reference to the FIG. 1C3.

Figure 1:
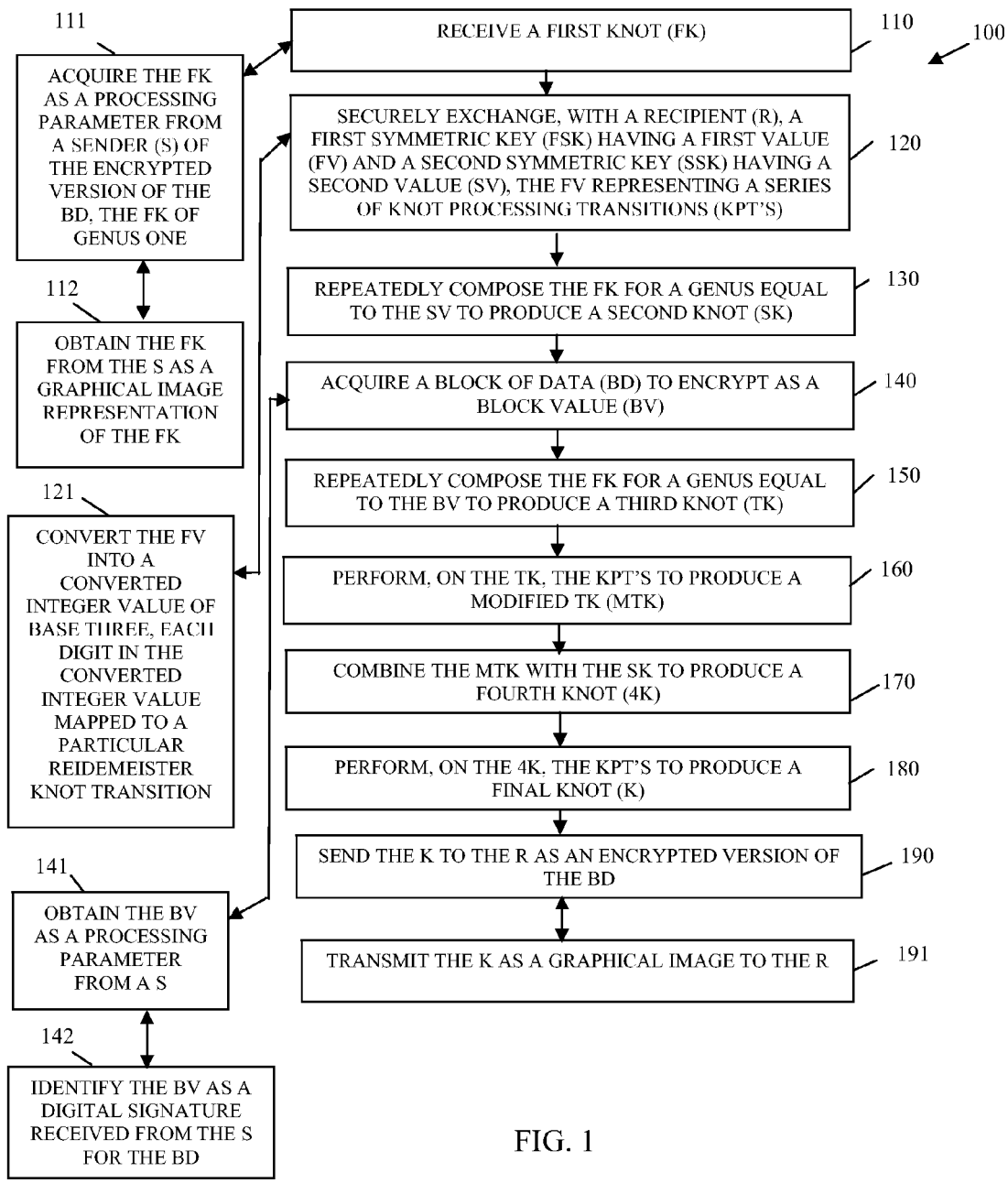
FIG. 1 is a diagram of a method for data encryption, according to an example embodiment.

FIG. 1 is a diagram of a method 100 for data encryption, according to an example embodiment. The method 100 (hereinafter "secure encryption service") is implemented as instructions in a machine-accessible and/or computer-readable storage medium. The instructions when executed by a machine (processing device, computer, etc.) perform the processing depicted in FIG. 1. The secure encryption service is also operational over and processes within communication network. The network may be wired, wireless, or a combination of wired and wireless.

In some cases, a processing device (one or more processors) is specifically configured to execute the instructions representing the secure encryption service.

At 110, secure encryption service receives a first knot. According to an embodiment, at 111, the secure encryption service receives the first knot as a processing parameter from a sender that is attempting to securely encrypt a block of data that the sender wants to send to a recipient. The sender initially selects the first knot as a first knot having a genus of one.

Continuing with the embodiment of 110 and at 111, the secure encryption service obtains the first knot from the sender as a graphical image representation of the first knot. That is, the first knot is supplied as a set of pixels that visually depict the first knot selected by the sender and having an initial genus of one.

At 120, the secure encryption service securely exchanges, with a recipient, a first symmetric key. The first symmetric key has a first value (integer value). The secure encryption service also securely exchanges, with the recipient, a second symmetric key. Additionally, the second symmetric key as a second value (another integer value). The first and symmetric keys and the first and second values are different from one another.

The first value for the first symmetric key is used by the secure encryption service to represent a series of knot processing transitions (moves) that are to be performed against the first knot (as discussed more completely herein and below).

In an embodiment, at 121, the secure encryption service converts the first value of the first symmetric key into a particular integer value of base three. So, the integer value of the first value can only include digits of 0-2 (three different digits being "0," "1," and "2."). Each digit in the base-three integer value maps to one of three available Reidemeister moves that can be performed against the first knot. Moreover, the ordering of each digit within the base-three integer value represents a specific sequence for performing the Reidemeister moves against the first knot.

At 130, the secure encryption service repeatedly composes the first knot for a genus equal to the second value of the second symmetric key. This produces a second knot having genus equal to the second value. This is achievable because the genus of a knot is additive under composition.

So, now the secure encryption service has a first knot (originally selected by the sender and having a genus of one), a base-three integer value (each digit representing a particular Reidemeister move against a knot and the order of the digits representing a specific sequence for performing the moves), and a second knot (representing the first knot composed to have a genus equal to the second value).

At 140, the secure encryption service acquires a block of data to encrypt as a block value. This is the data or information that the sender selects and wants to be sent securely and in an encrypted format to the recipient.

Again, in some cases, at 141, this block value is obtained from the sender as a processing parameter to the processing of the secure encryption service. It is noted that the block value may already be in an encrypted format, such as shown at 142, where the secure encryption service identifies the block value as a digital signature. So, the block of data provided by a sender may itself already be encrypted when received from the sender.

At 150, the secure encryption service repeatedly composes the first knot for a genus equal to the block value (integer value for the block of data being encrypted). This results in the production of yet another third knot.

At 160, the secure encryption service performs the knot processing transitions against the third knot in accordance with the first value to produce a modified third knot. Here, each Reidemeister move defined by a digit of the first value is processed in the order of the digits defined in the first value to produce the modified third knot.

Next, at 170, the secure encryption service combines the modified third knot with the second knot (the first knot composed to a genus equal to the second value for the second symmetric key). This combined modified third knot with the second knot results in the production of still another fourth knot.

At 180, the secure encryption service performs against the fourth knot each knot processing transition (move) defined in the first value and in the order defined by the first value to produce a final knot.

At 190, secure encryption service sends the final knot to the recipient as an encrypted version of the original block of data that the sender wanted securely encrypted and sent to the recipient.

According to an embodiment, at 191, the secure encryption service transmits the final knot as a graphical image to the recipient. So, if an intruder tried to acquire the encrypted block of data that intruder would have to decode a set of pixel images representing a variety of entwined knots. It may not even be possible for an intruder to do so. Therefore, the encrypted block of data is highly secure and more secure then previous techniques of data encryption heretofore provided in the industry.

Figure 2:
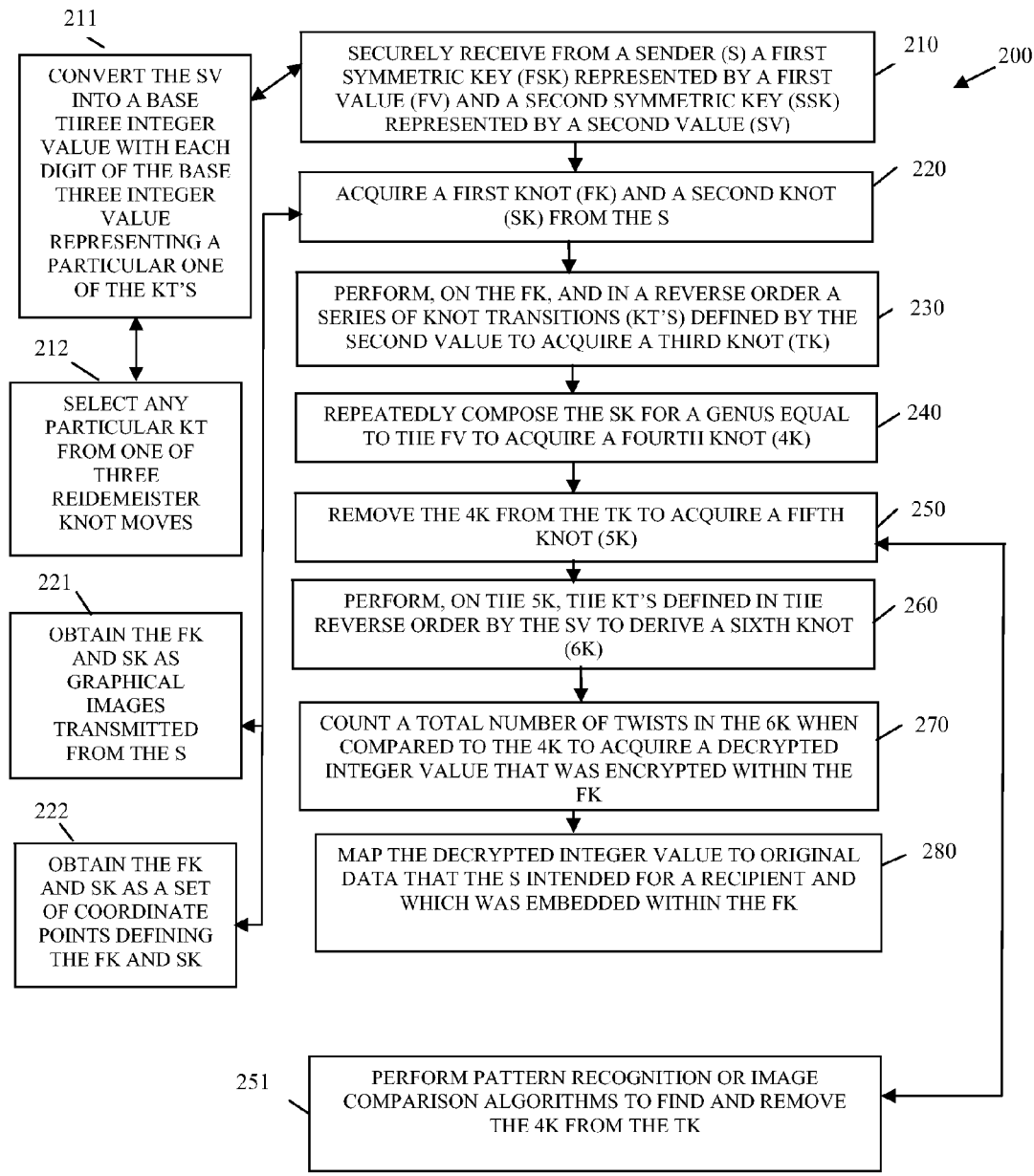
FIG. 2 is a diagram of a method for decrypting data that was encrypted by the method depicted in the FIG. 1, according to an example embodiment.

FIG. 2 is a diagram of a method 200 for decrypting data that was encrypted by the method depicted in the FIG. 1, according to an example embodiment. The method 200 (herein after referred to as "secure decryption service") is implemented in and resides within a machine-accessible and computer-readable storage medium as instructions, which when processed by a machine (one or more processors, etc.) performs the processing depicted in the FIG. 2. The secure decryption service is also operational over a communication network. The network is wired, wireless, or a combination of wired and wireless.

The secure decryption service represents processing that takes place after a sender securely encrypts a block of data in the manner discussed and presented in detail above with the secure encryption service of the method 100 for the FIG. 1.

The processing of the secure decryption service takes place on the recipient's side of the secure data transaction. That is, the processing implementing the secure decryption service can occur on a client of a recipient or on a proxy device that is acting on behalf of the recipient within a secure (firewall) environment of the recipient. The client and/or proxy (types of processing devices) are specifically configured to execute the instructions of the secure decryption service.

At 210, the secure decryption service securely receives from a sender a first symmetric key, which is represented by a first value (first integer value). The secure decryption service also receives from the sender a second symmetric key, which is represented by a second value (second integer value). Again, the first and second keys and values are different from one another. This size and/or length of these keys and values can be configurable and negotiated between the sender and the receiver.

According to an embodiment, at 211, the secure decryption service converts the second value into a base-three integer value, such that each digit of the base-three integer value represents a particular one of a series of knot transitions (knot moves). The order of the digits in the base-three integer value also provides a specific and unique sequence for performing each of the knot moves.

Continuing with the embodiment of 211 and at 212, the secure decryption service selects any particular knot move defined by a particular digit of the base-three integer value as one of three available Reidemeister moves. For example Reidemeister defines three moves a first move that permits a twist or untwist of a knot in either direction, a second move that moves one loop completely over another, and a third move that moves s string completely over or under a crossing in the knot. The base-three integer value may be three digits in length and provided as 021. Here, "0" maps to move 1, "1" maps to move 2, and "2" maps to move 3. So, the secure decryption service identifies that 3 Reidemeister moves are to be performed in the sequence of move 1 followed by move 3 and finished with move 2 (021).

At 220, the secure decryption service acquires a first knot and a second knot from the sender. The first knot representing an encryption of a block of data that the sender is providing to a recipient in a secure encrypted format (as defined by the method 100 of the FIG. 1) and the second knot being a base knot of genus one, which the sender used during the encryption process (also defined above by the method 100 of the FIG. 1).

According to an embodiment, at 221, the first and/or the second knots are both received from the sender as graphical images. That is, the knots are nothing more than pixel images when received by the secure decryption service.

In another situation, at 222, the first and/or second knots are both received from the sender as coordinate points define the first and second knots. Here, knot coordinate notation is used so that the secure decryption service can reconstruct the first and second knots.

At 230, the secure decryption service performs against the first knot a series of knot transitions in a reverse order that is defined by second value (provided with the second symmetric key and negotiated between the sender and receiver securely when the initial session was established to transmit encrypted data from the sender to the receiver over the network). The performance of these knot transitions in reverse order against the first knot results in the production of a third knot.

At 240, the secure decryption service repeatedly composes the second knot for a genus equal to the first value to acquire a fourth knot.

At 250, the secure decryption service then removes the fourth knot from the third knot to acquire a fifth knot. Here, once the fourth knot is removed from the third knot the secure decryption service has the original second knot (knot selected by the sender as a base knot of genus one) with a genus equal to the (integer value of the data being encrypted), where that original second knot of genus equal to the encrypted data's value has been transitioned to a series of moves defined by the second value.

According to an embodiment, at 251, the secure decryption service performs pattern recognition or image comparison algorithms against the third knot and fourth knot to recognize the fourth knot embedded within the third knot and to remove the fourth knot from the third knot.

At 260, the secure decryption service performs the knot transitions (knot moves) against the fifth knot in a reverse order defined by the second value to derive a sixth knot. This sixth knot is the base second knot (discussed above at 220) having a genus that is equal to the integer value of the data that the sender is sending to the recipient.

So, at 270, the secure decryption service counts a total number of twists that occur in the sixth knot from the base second knot to acquire an integer value representing the data being encrypted by a sender. That encrypted data's integer value was originally encrypted and embedded in the first knot supplied (in some cases in image form) from the sender to a recipient.

In an embodiment, at 280, the secure decryption service then maps the decrypted integer value to original data that the sender intended to send for the recipient and again which was embedded in the first knot. The mapping from the integer value to specific data can itself involve another form of decryption. In some cases, the secure decryption service is knot involved in this part of the decryption processing; rather, once the integer value is produced for the recipient that value is passed to another decryption service for further processing.

It is now apparent, that the encryption and decryption mechanisms presented herein are highly secure and advanced over what has been provided in the industry to date.

FIG. 3 is a diagram of a data encryption and decryption system 100, according to an example embodiment. The data encryption and decryption system 100 is implemented as instructions on one or more processing devices. These processing devices are specifically configured to process the data encryption and decryption system 100. The data encryption and decryption system 100 is also operational over a communication network. The communication network is wired, wireless, or a combination of wired and wireless.

In an embodiment, the data encryption and decryption system 100 implements, among other things, the methods 100 and 200 of the FIGS. 1 and 2, respectively.

The data encryption and decryption system 100 includes an encryption service 301 and a decryption service 302. Each of these and their interactions with one another are now discussed in turn.

The encryption service 301 is implemented in a computer-readable storage medium and executes on the one or more processing devices having one or more processors that are associated with a sender's device. Example processing associated with the encryption service 301 was discussed in detail above with reference to the method 100 of the FIG. 1.

The encryption service 301 is configured to establish a first key, a second key, and a first knot with a receiving device of a recipient (discussed below with reference to the decryption service 302). The encryption service 301 is configured to represent a block of data being sent by a sender from the sending device as a final knot by using the first key, the second key, and the first knot. The mechanism and technique for doing this was presented in detail above with reference to the method 100 of the FIG. 1.

In an embodiment, the encryption service 301 is configured to use the first key to represent a series of Reidemeister moves that are to be performed against the first knot. Each digit of a base-three integer value for the first key represents a particular one of the Reidemeister moves. The ordering of the digits within the base-three integer value also provides a specific sequence that each of the particular moves is to be performed.

In a particular situation, both the first and final knots are initially represented to both the encryption 301 and decryption 302 services as graphical images of knots.

Moreover, the block of data being encrypted by the sender via the encryption service 301 can itself be already represented in another encrypted format and provided to the encryption service 301 as an encrypted integer value. So, dual levels of encryption are achievable for added security.

The decryption service 302 is implemented in a computer-readable storage medium and executes on the one or more processing devices having one or more processors associated with a recipient's computing device. Example processing associated with the decryption service 302 was discussed in detail above with reference to the method 200 of the FIG. 2.

The decryption service 302 is configured to decrypt the block of data from the final knot provided by the encryption service 301 by also using the first key, the second key, and the first knot. The mechanisms and techniques for achieving this decryption were provided in detail above with reference to the method 200 of the FIG. 2.

In a particular case, the decryption service 302 is configured to use the base-three integer value represented by the first key to perform the Reidemeister moves against the final knot in a reverse order.

In an embodiment, the encryption service 301 and the decryption service 302 are configured to communicate over the network with one another via a secure symmetric key protocol, such as Secure Remote Password (SRP), Diffie-Hellman style protocols, etc.

Therefore, it is also noted that before the encryption 301 and decryption 302 service exchange keys, secure communication via authentication is established to set up a secure session between the sending device and the recipient device for the sender and recipient to communicate with one another. Once this is successfully achieved, the sender, via the encryption service 301, provides encrypted data (encrypted integer value), via a final knot (graphical image of a knot having a variety of transitions performed thereon). This approach is highly secure and a substantial improvement over what has been heretofore provided in the industry.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method to execute on a computer processor, the processor configured to perform the method comprising:
   receiving by the processor, a first knot;
   securely exchanging, with a recipient device, a first symmetric key having a first value and a second symmetric key having a second value, the first value representing a series of knot processing transitions, the first value providing transition moves against the first knot and an order for each move;
   repeatedly composing the first knot for a genus equal to the second value to produce a second knot using the moves and the order identified with the first value, each genus for each knot under composition is additive;
   acquiring a block of data to encrypt as a block value;
   repeatedly composing the first knot for a genus equal to the block value to produce a third knot;
   performing, on the third knot, the series of knot processing transitions to produce a modified third knot using the moves and the order identified with the first value;
   combining the modified third knot with the second knot to produce a fourth knot;
   performing, on the fourth knot, the series of knot processing transitions to produce a final knot; and
   sending the final knot to the recipient device as an encrypted version of the block of data.

2. The method of claim 1, wherein receiving further includes acquiring the first knot as a processing parameter from a sender of the encrypted version of the block of data, the first knot of genus one.

3. The method of claim 2, wherein acquiring further includes obtaining the first knot from the sender as a graphical image representation of the first knot.

4. The method of claim 1, wherein securely exchanging further includes converting the first value into a converted integer value of base three, each digit in the converted integer value mapping to a particular Reidemeister knot transition.

5. The method of claim 1, wherein acquiring further includes obtaining the block value as a processing parameter from a sender.

6. The method of claim 5, wherein obtaining further includes identifying the block value as a digital signature received from the sender for the block of data.

7. The method of claim 1, wherein sending further includes transmitting the final knot as a graphical image to the recipient.

8. A processor-implemented method to execute on a computer processor, the processor configured to perform the method comprising:
   securely receiving by the processor from a sender device a first symmetric key represented by a first value and a second symmetric key represented by a second value;
   acquiring a first knot and a second knot from the sender device;
   performing, on the first knot, and in a reverse order a series of knot transitions defined by the second value to acquire a third knot, each knot transition and an order for the series of knot transitions defined in the second value;
   repeatedly composing the second knot for a genus equal to the first value to acquire a fourth knot using the series of knot transitions and the order;
   removing the fourth knot from the third knot to acquire a fifth knot;
   performing, on the fifth knot, the series of knot transitions in the order defined in the reverse order by the second value to derive a sixth knot; and
   counting a total number of twists in the sixth knot when compared to the second knot to acquire a decrypted integer value that was encrypted within the first knot.

9. The method of claim 8 further comprising, mapping the decrypted integer value to original data that the sender intended for a recipient and which was embedded within the first knot.

10. The method of claim 8, wherein securely receiving further includes converting the second value into a base three integer value with each digit of the base three integer value representing a particular one of the knot transitions.

11. The method of claim 10, wherein converting further includes selecting any particular knot transition from one of three Reidemeister knot moves.

12. The method of claim 8, wherein acquiring further includes obtaining the first and second knots as graphical images transmitted from the sender.

13. The method of claim 8, wherein acquiring further includes obtaining the first and second knots as a set of coordinate points defining the first and second knots.

14. The method of claim 8, wherein removing further includes performing pattern recognition or image comparison algorithms to find and remove the fourth knot from the third knot.

\* \* \* \* \*